(12) United States Patent
Baumgartner

(10) Patent No.: US 8,336,600 B2
(45) Date of Patent: Dec. 25, 2012

(54) CASTING DEVICE

(75) Inventor: Konrad Baumgartner, Blonay/VD (CH)

(73) Assignee: Fondarex SA, St. Legier (CH)

( * ) Notice: Subject to any disclaimer, the term of this patent is extended or adjusted under 35 U.S.C. 154(b) by 0 days.

(21) Appl. No.: 12/754,723

(22) Filed: Apr. 6, 2010

(65) Prior Publication Data
US 2010/0252222 A1    Oct. 7, 2010

(30) Foreign Application Priority Data
Apr. 6, 2009    (CH) ..................... 0556/09

(51) Int. Cl.
*B22D 17/00* (2006.01)
*B22D 17/14* (2006.01)
*B22D 27/15* (2006.01)

(52) U.S. Cl. .......... 164/61; 164/113; 164/253; 164/305; 164/312; 164/410

(58) Field of Classification Search ............... 164/305, 164/410, 61, 253, 113, 312, 313
See application file for complete search history.

(56) References Cited

U.S. PATENT DOCUMENTS

| | | | |
|---|---|---|---|
| 2,972,172 A * | 2/1961 | Federman | 164/113 |
| 4,787,436 A * | 11/1988 | Ozeki et al. | 164/305 |
| 4,986,338 A * | 1/1991 | Yamauchi et al. | 164/457 |
| 5,246,055 A * | 9/1993 | Fields et al. | 164/61 |
| 5,662,156 A * | 9/1997 | Freeman | 164/61 |
| 5,842,509 A * | 12/1998 | Nagashima et al. | 164/72 |
| 6,997,231 B1 | 2/2006 | Jung et al. | |
| 2001/0002617 A1 | 6/2001 | Schofield et al. | |
| 2007/0137827 A1 * | 6/2007 | Vogt et al. | 164/113 |

FOREIGN PATENT DOCUMENTS

| | | |
|---|---|---|
| DE | 19914830 A1 | 5/2000 |
| EP | 0612573 A2 | 11/1994 |
| EP | 0790090 A2 | 8/1997 |
| EP | 1295655 A1 | 3/2003 |
| JP | 2004148349 A1 | 5/2004 |

OTHER PUBLICATIONS

Swiss search report for priority application, CH00556/09, May 28, 2009, Swiss Patent Office.

* cited by examiner

*Primary Examiner* — Kevin P Kerns
(74) *Attorney, Agent, or Firm* — Maginot, Moore & Beck, LLP

(57) ABSTRACT

The casting device (1) comprises a die (3) consisting of two die halves (3a, 3b) forming in their interior a die cavity (4). In addition, the casting device (1) comprises connected to the die cavity (4) a casting chamber (6), the outlet (9) of which can be closed off at least partially by means of a closure member (18, 26). At least the one die half (3a) is provided with a vent passage (13) for evacuating the die cavity (4) and/or the casting chamber (6). The vent passage (13) ports into the die parting (12) of the one die half (3a) such that it can be closed off by the other die half (3b) when locking the die (3).

13 Claims, 3 Drawing Sheets

CASTING DEVICE

BACKGROUND

The invention relates to a casting device and to a method of venting casting devices.

In both die casting and injection molding air voids must be avoided in the finished part to ensure high quality thereof. Achieving this necessitates reliable venting of not only any air from the die cavities but also any gas escaping from the molten casting mass.

For venting gases entrapped in the die cavity, venting means for casting devices are known from prior art featuring so-called cooling blocks. In this arrangement each cooling block arranged at the end of a vent passage connecting the die cavity has the task of venting the gases whereby the molten casting material is cooled and solidified on having entered the cooling block. Another venting system features valve devices in the vent passage, two basic types of which are known, each comprising a vent valve with a reciprocating closure member for closing off the vent passage. Whilst in the first type the closure member is activated remotely, in the second type it cooperates with a force transducer directly actuated by the casting material urged from the cavity into the vent passage in exploiting its kinetic energy.

Known from EP 0 612 573 is valve means for venting casting dies provided with a vent passage, a vent valve in the latter and an actuator for closing the vent valves. The actuator comprises a force transducer responding to the casting material entering the the vent passage from the cavity, it mechanically communicating with the movable closure member of the vent valve. In this arrangement the force transducer is configured as a pusher the working stroke of which is limited to a fraction of the travel of the movable closure member in closing off the vent valve. In addition, the closure member of the vent valve has idle movement exceeding the working stroke of the force transducer and the actuator comprises a force transmitter for communicating the activating pulse from the force transducer to the movable closure member of the vent valve.

To boost productivity casting devices have been developed which feature a casting chamber, the outlet of which can be closed off at least partially by a closure member with the advantage of shortening the cycling time since the casting chamber is shot either before or when the die is closed. The drawback with shortening the cycling time is, however, the added risk of air voids.

Known from DE 199 14 830 A1 is a casting device provided with a closure member. This casting device comprises a fixed first die half and a movable second die half, both of which define between them the die cavity to be shot with the molten metal. The first die half is provided with a casting chamber housing a casting plunger guided therein. The inlet end of the casting chamber features a metering orifice whilst the outlet of the casting chamber is connected to the die cavity by a runner. Arranged in the region of the casting chamber and connected to a hydraulic system by a piston rod is a bevelled valve for closing off the outlet of the casting chamber. A vent passage leads out of the cavity of the die communicating with a means for developing a vacuum and with a vacuum shutoff valve. Casting firstly requires the die cavity and the runner to be evacuated via the shutoff valve, after which the molten metal is shot into the casting chamber. After metering of the casting material the casting plunger travels via the metering orifice into the casting chamber until the chamber is shot with the molten metal. It is not until the casting chamber is shot 100% with the molten metal that the valve is opened so that the molten metal can enter the die cavity via the runner.

SUMMARY

One object of the invention is to propose a casting device having an at least partly closable casting chamber which has a simple configuration and is insensitive to becoming soiled. The casting device is designed to optimize the cycle time whilst ensuring high quality of the finished part by excluding air voids practically completely.

This object is achieved by certain features including a sealing member arranged at one die half which when mating with the other die half sealingly contacts the other die half. A vent passage is provided porting, in one embodiment, radially within the sealing member into the die parting of the one die half such that it can be closed off by the other die half on closing the die. In another embodiment, the vent passage is recessed at least partially in the die parting and at least part of the vent passage is recessed in the die parting running radially within the sealing member.

Since the one half of the die features a sealing member enclosing at least the die cavity and sealingly contacts the other half of the die when both halves are mated it is now made sure that gases can be evacuated from the die cavity and/or casting chamber as soon as the two die halves are fully mated. Now, namely, the gases can be evacuated from the interior of the die via the vent passage as soon as the sealing member arranged on the one die half forms a seal with the other die half. Any gases still existing between the two halves of the die can now be speedily and efficiently evacuated from the die cavity and/or casting chamber. This is why this embodiment is preferably suitable for rapid evacuation of the cavities in the die. Porting the vent passage into the die parting of the one die half so that it closes off the other die half when the die is closed, now makes it possible to eliminate additional means for closing off the vent passage, since the vent passage can now be closed off by the die itself, namely by the one half of the die. Where the vent passage is recessed at least partially in the die parting, at least the part or portion of the vent passage recessed in the die parting must run within the sealing member so that gases can be evacuated from the die cavity and/or the casting chamber even before the two die halves are fully mated.

In further embodiments the casting device includes, for instance, one die half being arranged fixed whilst the other die half is arranged reciprocatable between a first and second position, wherein in the first position the sealing ring is arranged at one die half in sealing contact with the other die half. Moreover, in the first position a gap remains between the two die halves through which gases can be evacuated from the die cavity and/or casting chamber. In the second position the gap between the two die halves is eliminated. In a further feature, the vent passage ports into the die parting of the one die half at an angle ranging from 30° to 90°. At the one die half a sealing member encloses the die cavity and the port of the vent passage is arranged to sealingly contact the other die half when the two die halves are mated.

A further object of the invention is to propose a method for venting casting devices with which despite a shortened cycle time the quality of the castings can be optimized by air voids now being reliably avoided.

This object may be achieved in one embodiment by the outlet of the casting chamber being closed off at least partially by means of a closure member, and then during injection of casting material into the casting chamber the die cavity and/or the casting chamber is/are evacuated.

In further embodiments of the method in one die half of the casting device, radially enclosing the die cavity as well as the vent passage, a sealing ring sealingly contacting the other die half when the two die halves are mated. In this embodiment, both die halves are mated until the sealing ring arranged at the one die half sealingly contacts the other die half and that thereafter gases are evacuated from the die cavity and/or the casting chamber via the gap remaining between the two die halves. In another aspect, before injecting casting material into the die cavity gases are evacuated from the die cavity and/or the casting chamber via a gap.

DESCRIPTION OF THE FIGURES

An exemplary embodiment will now be detailed with reference to the drawings in which.

DESCRIPTION OF THE EMBODIMENTS

Figure 1:
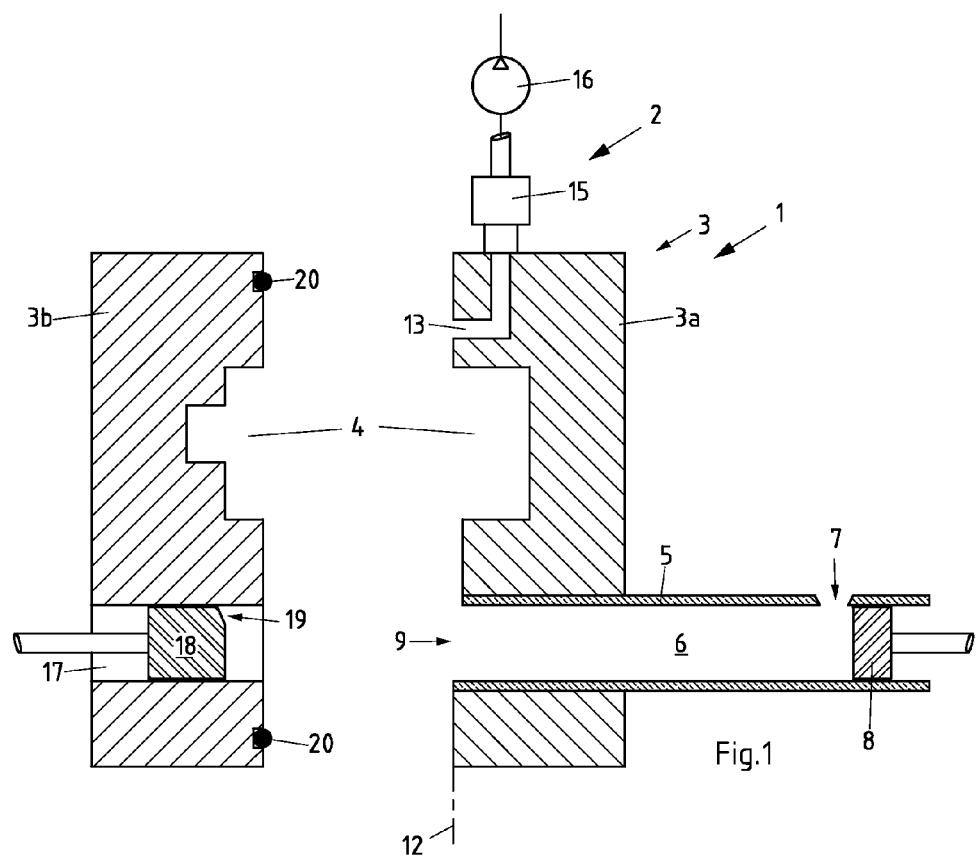
FIG. 1 is a cross section through a casting device depicted diagrammatically.

Referring now to FIG. 1 there is illustrated a cross section through a casting device 1 depicted diagrammatically together with a venting means 2. The basic configuration of the casting device 1 comprises a die 3 consisting of two die halves 3a, 3b defining internally a die cavity 4 for the casting. The two die halves 3a, 3b are shown in the open starting condition. The right-hand die half 3a is arranged fixed, it being provided with an injector 5 the interior of which forms the casting chamber 6. The injector 5 is topped by an orifice 7 for injecting the casting material. Reciprocatingly guided in the casting chamber 6 is a plunger 8. For the casting material the casting chamber 6 features an outlet 9 porting into the portion of the die parting 12 of the fixed die half 3a.

The fixed die half 3a is provided with a vent passage 13 porting at right angles into the die parting above the die cavity 4. The vent passage 13 leads, starting at the die parting 12, into the interior of the die 3 where it is reoriented through 90° to be brought out from the top of the fixed die half 3a. Topping the fixed die half 3a at the end of the vent passage 13 is the venting means 2 comprising a filter 15 and a vacuum unit 16. The vacuum unit 16 serves to automatically vent the die cavity 4. Arranged at the movable, left-hand die half 3b is a sealing ring 20 oriented radially outside of the die cavity 4 as well as of the porting of the vent passage 13. Therefore, the vent passage 13 porting radially within the sealing ring 20 into the die parting 12. The function of this sealing ring 20 is subsequently detailed in conjunction with the venting means 2. Although the vent passage 13 in the present example ports into the die parting 12 of the fixed die half 3a at a right angle, it is understood that it may be ported into the die parting 12 also at any other angle, for example ranging from approx. 30° to 90°.

The left-hand die half 3b is designed to reciprocate between a first and second position, a cylindrical chamber 17 being recessed in the die half 3b level with the casting chamber 6. Reciprocatingly mounted in the cylindrical chamber 17 is a closure member in the form of a plunger 18 serving to close off the casting chamber 6. To promote venting the casting chamber 6 the plunger 18 may be topped by a bevel 19. As an alternative to this bevel 19 an outward leading passage, recess, orifice or the like may be provided to permit venting the casting chamber 6 when closed off by the plunger 18 at the outlet end. Additionally arranged at the movable die half 3b is the sealing ring 20 which on closure of the die 3 sealingly contacts the face of the fixed die half 3a so that the face port of the vent passage 13 as well as the die cavity 4 are radially enclosed by the sealing ring 20. Instead of a plunger 18 a spool or the like may also be provided by means of which the casting chamber 6 can be closed off. One such spool is detailed further on.

Figure 2:
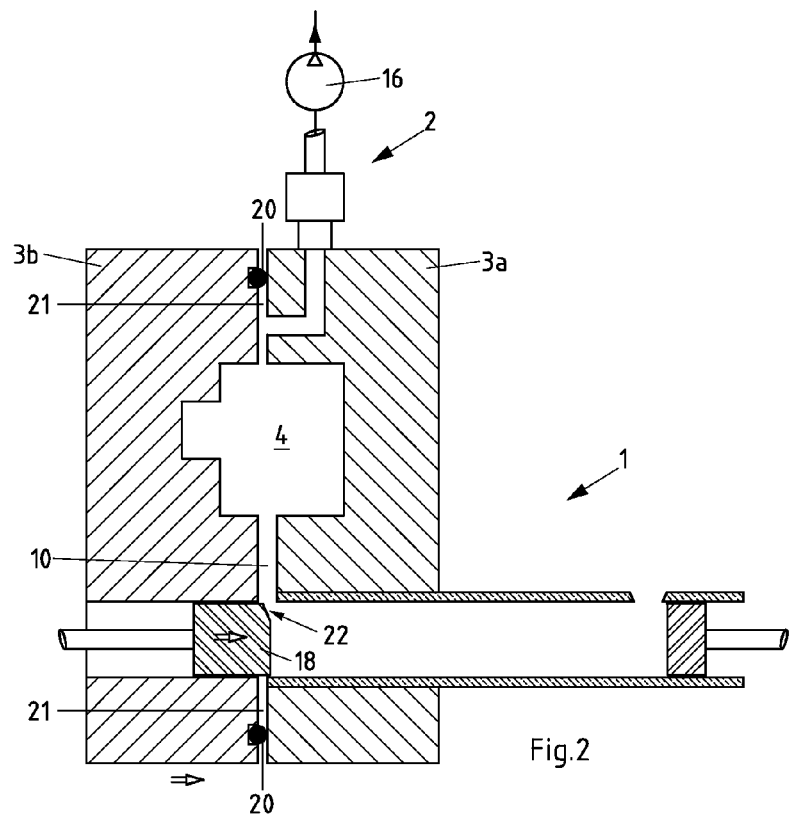
FIG. 2 is a diagrammatic view of the casting device as shown in FIG. 1 during a first venting phase.

The functioning of the casting device will now be detailed:

Referring now to FIG. 2 there is illustrated how after the movable left-hand die half 3b is moved to the first position by it being travelled to the right against the fixed die half 3a until the sealing ring 20 sealingly contacts the face of the fixed die half 3a, a gap 21 remains in this first position between the faces of the two die halves 3a, 3b since the sealing ring 20 is yet to be compressed. The outlet of the casting chamber 6 is then connected to the die cavity 4 via the gate 10. Although in this condition the gap 21 as well as the die cavity 4 and the port of the vent passage 13 are sealed off from the outside by the sealing ring 20, the gap 21 promotes escape or evacuation of the gases present in the die cavity 4 as well as in the casting chamber 6.

Once the two die halves 3a, 3b are mated, except for the gap 21, the plunger 18 is travelled in the direction of the fixed die half 3a to practically close off the outlet 9 of the casting chamber 6. However, because of the bevel topping the plunger 18 a communicating passage 22 still exists enabling the gases to escape even though the casting chamber 6 is closed off from the outside.

Figure 3:
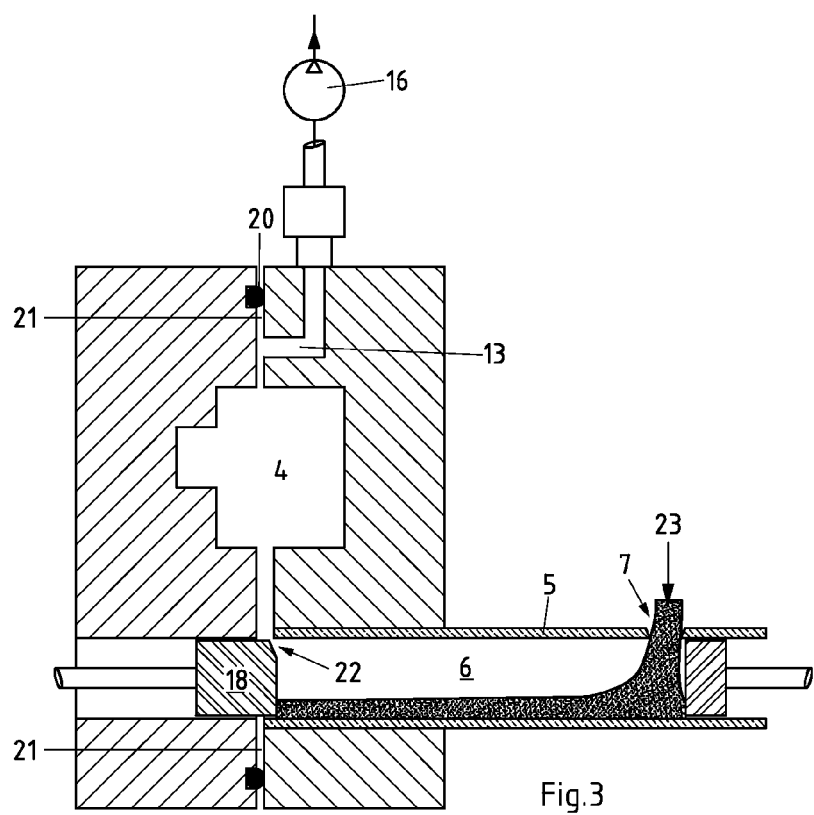
FIG. 3 is a diagrammatic view of the casting device as shown in FIG. 1 during a second venting phase.
Figure 4:
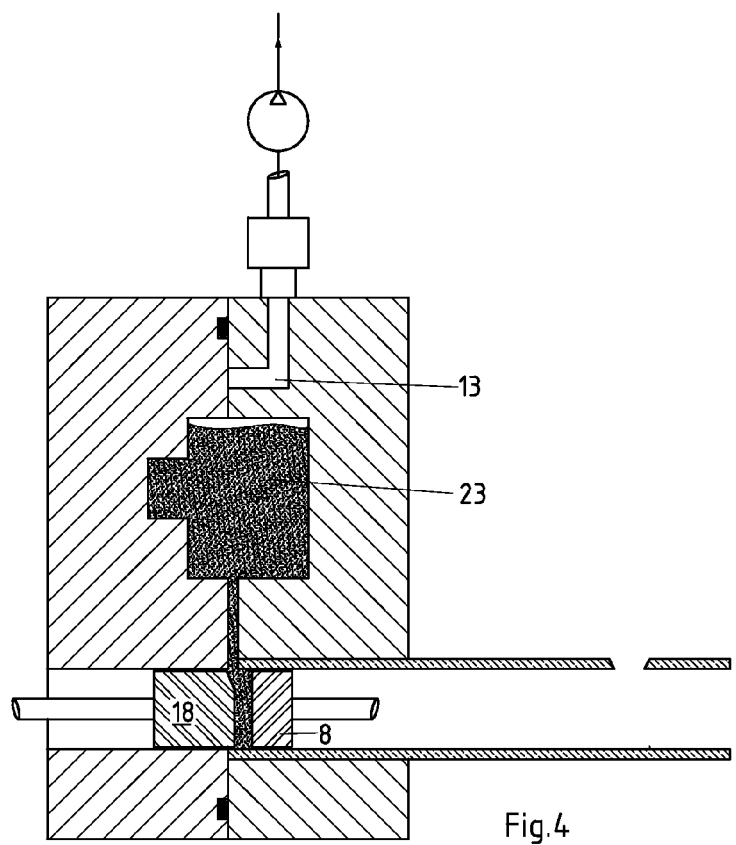
FIG. 4 is a diagrammatic view of the casting device as shown in FIG. 1 during a third venting phase.

Referring now to FIG. 3 there is illustrated how as soon as the plunger 18 closes off the outlet 9 of the casting chamber 6 at least partially, injecting the casting material can be commenced. The casting material 23 is injected via the orifice 7 of the injector 5 into the casting chamber 6 where it is consolidated at the outlet end by the plunger 18 and prevented from emerging from the casting chamber 6. As early as this phase gases can be evacuated from the casting chamber 6 and the die cavity 4 via the gap 21 and the vent passage 13 by means of the vacuum unit 16, the sealing ring 20 ensuring that the gap 21 between the two die halves 3a, 3b is sealed off from the outside. Once the amount needed to fill the die cavity 4 with casting material has been shot into the casting chamber 6, the two die halves 3a, 3b are fully mated by the movable die half 3b being moved into the second position. In this second position the sealing ring 20 is compressed, eliminating the gap 21 between the two die halves 3a, 3b. Referring now to FIG. 4 there is illustrated how to fill the die cavity 4, the plunger 18 is slightly retracted and the plunger 8 moved to the left in the direction of the movable die half 3b, so that the casting material 23 is forced out of the casting chamber 6 into the die cavity 4.

Closure of the two die halves 3a, 3b and elimination of the gap between the two die halves 3a, 3b also results in the vent passage 13 being closed off by the face of the movable die half 3b closing off the port of the vent passage 13. This simultaneously also ensures that the casting material 23 cannot emerge from the die cavity 4. Thus, this configuration has the advantage that no additional or moving elements such as valve devices or the like need to be provided to close off the vent passage or cooling blocks for catching and stopping the casting material emerging from the die cavity.

Since the casting chamber 6 was evacuated together with the die cavity 4 before the two die halves 3a, 3b are fully mated, only a relatively minor amount of gas is still in the cited cavities even after closure of the vent passage 13, depending on the level of the vacuum created in the process. This makes it possible to reliably avoid air voids in the finished casting even when the vent passage 13 is closed off before filling the die cavity 4.

Evacuating both the casting chamber 6 as well as the die cavity 4 permits making sure that not only the gases—air—trapped in the die 3 but also the gases emerging from the casting material can escape, thus making a major contribution towards achieving a high quality product as well as and high throughput due to the cyle time being shortened.

A conventional pump or Venturi pump can be provided as the vacuum unit 16 which in any case comprises a vacuum tank speeding up evacuation of the die cavity 4 and casting chamber 6.

Figure 5:
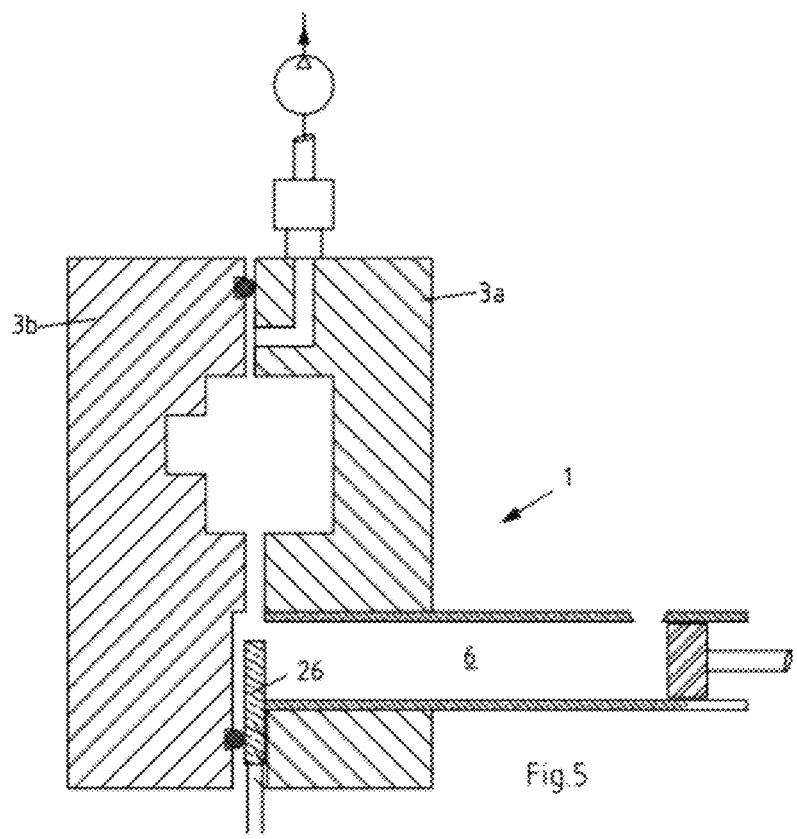
FIG. 5 is a cross section through a first alternative example embodiment of a casting device.

Referring now to FIG. 5 there is illustrated a cross section through a second example embodiment of the invention, namely the casting device 1 together with a venting means 2. The main difference of this from the example embodiment as described above is that, now, instead of a closure member arranged at the movable die half 3b a spool 26 for closing off the casting chamber 6 is arranged at the fixed die half 3a.

Figure 6:
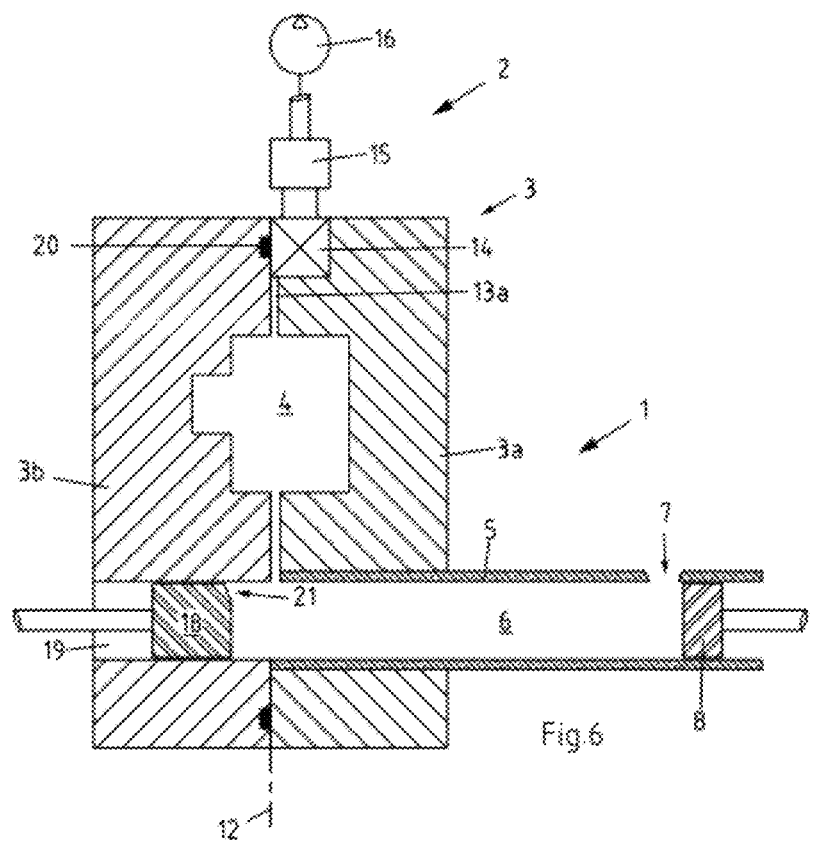
FIG. 6 is a cross section through a second alternative example embodiment of a casting device.

Referring now to FIG. 6 there is illustrated a cross section through a third example embodiment of the invention. In this example there is no porting of the vent passage 13a into the face of the fixed die half 3a, instead a vent passage 13a connected to the die cavity 4 is provided, recessed at least partially in the die parting 12 and led off vertically upwards. The part of the vent passage 13a recessed in the die parting 12 runs within the sealing ring 20 so that in addition to the die cavity 4 the sealing ring 20 also encloses the part of the vent passage 13a recessed in the die parting 12 as soon as the sealing ring 20 contacts the fixed die half 3a.

Arranging for the vent passage 13a to have preferably just a small cross section has the intention of making sure that further gases can be evacuated even after the two die halves 3a, 3b are fully closed. To prevent, however, casting material from emerging from the die 3 via the vent passage 13a it is provided for that the vent passage 13a ports into a vent valve 14 which may be a remotely actuated valve or a valve actuated by the casting material. Instead of the vent valve 14 a so-called cooling block or the like may be provided. The outlet of the vent valve 14 is in turn connected to the vacuum unit 16 serving to automatically vent the die cavity 4 as well as the casting chamber 6. Disposed between the vent valve 14 and the vacuum unit 16 is a filter 15. After closure of the two die halves 3a, 3b the vent passage 13a is defined at one end by the movable die half 3b.

With this casting device evacuation can be done in two stages in which the gases in the first stage, namely before the die 3 is fully closed, can be evacuated via the gap remaining between the two die halves 3a, 3b, whilst in the second stage, with the die 3 closed, evacuation is done solely via the small cross section of the vent passage 13a. The cross section of the vent passage 13a is preferably selected so that just a relatively minor amount of casting material is able to ingress per unit of time.

The casting devices 1 as shown are basically suitable for both die casting and injection molding, both cold and hot chamber die casting being possible for metal casting. However, in injection molding plastics too, the casting device 1 in accordance with the invention can be basically put to use, then a plastification cylinder or the like being provided instead of the casting chamber. It is thus understood that the term casting chamber is not exclusively limited to conventional casting chambers, it instead covering all types of chambers, cylinders or the like serving to handle or receive the casting material.

What is claimed is:

1. A casting device (1) including a die (3) defining a die cavity (4) and including two die halves (3a, 3b) configured for mating at a die parting (12) as well as a casting chamber (6) having an outlet (9) in communication with the die cavity, the casting device further including a closure member (18, 26) movable relative to the die halves to at least partially close the outlet, at least one die half (3a) being provided with a vent passage (13) for venting the die cavity (4) and/or the casting chamber (6), the casting device further comprising:

a sealing member (20) mounted in one of the two die halves (3a, 3b) and arranged to sealingly contact the other of the die halves (3b, 3a) when said die halves are mated at said die parting, wherein the vent passage (13) is arranged to port into the die parting (12) between said sealing member and said die cavity such that said vent passage is closed off when the die halves contact each other at said die parting, and wherein said closure member includes a spool (26) movable transversely to a longitudinal centerline of the casting chamber (6).

2. The casting device (1) as set forth in claim 1, characterized in that:

one die half (3a) is arranged fixed whilst the other die half (3b) is arranged reciprocatable between a first and second position;

wherein in the first position the sealing member (20) sealingly contacts the two die halves (3a, 3b) and a gap (21) remains between the two die halves (3a, 3b) via which gases can be evacuated from the die cavity (4) and/or casting chamber (6), and in the second position the gap between the two die halves (3a, 3b) is eliminated and the die halves contact each other at said die parting.

3. The casting device (1) as set forth in claim 2, characterized in that:

the vent passage (13) ports into the die parting (12) of the one die half at an angle ranging from 30° to 90°; and said sealing member (20) is disposed in the other die half enclosing the die cavity (4) and the port of the vent passage (13) when the two die halves (3a, 3b) are mated.

4. The casting device (1) as set forth in claim 1, characterized in that:

the vent passage (13) ports into the die parting (12) of the one die half at an angle ranging from 30° to 90°; and said sealing member (20) is disposed in the other die half enclosing the die cavity (4) and the port of the vent passage (13) when the two die halves (3a, 3b) are mated.

5. The casting device (1) as set forth in claim 1, characterized in that the casting device (1) includes:

venting means (2) for evacuating the die cavity (4) and/or the casting chamber (6); and means (16) for generating a vacuum in the vent passage (13).

6. The casting device (1) as set forth in claim 5, characterized in that the means (16) for generating a vacuum in the vent passage (13) includes a pump and/or a vacuum tank.

7. The casting device (1) as set forth in claim 1, characterized in that the casting chamber (6) is defined in one die half (3a) and said closure member is arranged at the same die half (3a).

8. The casting device (1) as set forth in claim 1, characterized in that the vent passage (13, 13a) is recessed in one die half (3*a*) such that when the casting chamber (6) is closed off only in part, both the die cavity (4) as well as the casting chamber (6) are automatically evacuated.

9. A casting device (1) including a die (3) defining a die cavity (4) and including two die halves (3*a*, 3*b*) configured for mating at a die parting (12) as well as a casting chamber (6) having an outlet (9) in communication with the die cavity, the casting device further including a closure member (18, 26) movable relative to the die halves to at least partially close the outlet, at least the one die half (3*a*) being provided with a vent passage (13*a*) for venting the die cavity (4) and/or the casting chamber (6), the casting device further comprising:

a sealing member (20) mounted in one of the two die halves (3*b*) and arranged to sealingly contact the other of the die halves (3*a*) when said die halves are mated at said die parting, wherein the vent passage (13*a*) includes a recess defined in said other of the die halves (3*a*) at least partially in the die parting (12) and intersecting said die cavity;

wherein said sealing member is a sealing ring (20) enclosing the die cavity (4) as well as at least part of the vent passage (13*a*) running in the die parting (12), and wherein said closure member includes a spool (26) movable transversely to a longitudinal centerline of the casting chamber (6).

10. The casting device (1) as set forth in claim 9, characterized in that:

one die half (3*a*) is arranged fixed whilst the other die half (3*b*) is arranged reciprocatable between a first and second position;

wherein in the first position the sealing member (20) sealingly contacts the two die halves (3*a*, 3*b*) and a gap (21) remains between the two die halves (3*a*, 3*b*) via which gases can be evacuated from the die cavity (4) and/or casting chamber (6), and in the second position the gap between the two die halves (3*a*, 3*b*) is eliminated and the die halves contact each other at said die parting.

11. The casting device (1) as set forth in claim 9, characterized in that the casting device (1) includes:

venting means (2) for evacuating the die cavity (4) and/or the casting chamber (6); and means (16) for generating a vacuum in the vent passage (13).

12. A method for venting casting devices (1) provided with a die (3) having two die halves (3*a*, 3*b*), a die cavity (4), a vent passage (13, 13*a*) in communication with the die cavity (4), and a casting chamber (6) connected to the die cavity (4), featuring at one die half (3*b*), radially enclosing the die cavity (4) as well as the vent passage (13, 13*a*), a sealing ring (20) sealingly contacting the other die half (3*a*) when the two die halves (3*a*, 3*b*) are mated, comprising the steps of:

mating both die halves (3*a*, 3*b*) only until the sealing ring (20) arranged at the one die half (3*b*) sealingly contacts the other die half (3*a*), leaving a gap (21) remaining between the two die halves in communication with the vent passage (13, 13*a*);

injecting casting material (23) into the casting chamber; and thereafter evacuating gases from the die cavity (4) and/or the casting chamber (6) via the gap (21) remaining between the two die halves.

13. The method as set forth in claim 12, characterized in that before injecting casting material into the die cavity (4) gases are evacuated from the die cavity (4) and/or the casting chamber (6) via the gap (21).

\* \* \* \* \*